United States Patent [19]
Uesugi

[11] 4,410,937
[45] Oct. 18, 1983

[54] METHOD OF CONTROLLING POLYPHASE INVERTERS AND CONTROL CIRCUITS THEREFOR

[75] Inventor: Michika Uesugi, Fuji, Japan

[73] Assignee: Tokyo Shibaura Denki Kabushiki Kaisha, Kanagawa, Japan

[21] Appl. No.: 295,106

[22] Filed: Aug. 21, 1981

[30] Foreign Application Priority Data

Sep. 1, 1980 [JP] Japan .................................. 55-120820

[51] Int. Cl.$^3$ ............................................ H02M 1/08
[52] U.S. Cl. ................................................... 363/132
[58] Field of Search ............ 363/98, 131, 132, 136–138

[56] References Cited

U.S. PATENT DOCUMENTS

| | | | |
|---|---|---|---|
| 4,330,820 | 5/1982 | Braun | 363/135 |
| 4,352,154 | 9/1982 | Reiber | 363/132 |
| 4,356,544 | 10/1982 | Ono et al. | 363/132 |

OTHER PUBLICATIONS

Elektronk (Germ.), vol. 25, No. 12, pp. 43–46, 53, Dec. 1976.

Primary Examiner—William H. Beha, Jr.
Attorney, Agent, or Firm—Stevens, Davis, Miller & Mosher

[57] ABSTRACT

Ideal polyphase sinusoidal waveforms are divided into a plurality of consecutive sections having equal width in electric angles, and the sections are encoded for different frequencies to form encoded data which are stored in a ROM. The data stored in the ROM are selectively read out according to a predetermined conduction pattern for an inverter. Then, the read out encoded data are combined in a succession to form positive half cycle waveforms and the read out encoded data are inverted and then combined to form negative half cycle waveforms so as to form polyphase sinusoidal waveforms utilized as control signals of the inverter.

4 Claims, 12 Drawing Figures

| | |
|---|---|
| $D_0$ | 0°~30° |
| $D_1$ | 30°~60° |
| $D_2$ | 60°~90° |
| $D_4$ | 150°~180° |
| $D_5$ | 120°~150° |
| $D_6$ | 90°~120° |

| ROM | | | | 30° | | |
|---|---|---|---|---|---|---|
| f  30°/64 | 0 | 1 | 2 | - - - - - - - - - - - | 63 |
| 0 Hz | | | | | |
| 25 Hz | D₀ | 1 | 1 | 1 | - - - - - - - - - - - | 1 |
|  | D₁ | 1 | 1 | 0 | - - - - - - - - - - - | 1 |
|  | D₂ | 0 | 0 | 0 | - - - - - - - - - - - | 0 |
|  | D₃ | | | | | |
|  | D₄ | 0 | 1 | 1 | - - - - - - - - - - - | 0 |
|  | D₅ | 1 | 1 | 1 | - - - - - - - - - - - | 1 |
|  | D₆ | 1 | 1 | 1 | - - - - - - - - - - - | 1 |
|  | D₇ | | | | | |
| 27.5 Hz | D₀ | | | | | |
|  | D₁ | | | | | |
|  | D₂ | | | | | |
|  | D₃ | | | | | |
|  | D₄ | | | | | |
| 72.5 Hz | D₄ | | | | | |
|  | D₅ | | | | | |
|  | D₆ | | | | | |
|  | D₇ | | | | | |
| 75 Hz | D₀ | 1 | 1 | 1 | - - - - - - - - - - - | 0 |
|  | D₁ | 1 | 1 | 1 | - - - - - - - - - - - | 1 |
|  | D₂ | 1 | 1 | 1 | - - - - - - - - - - - | 1 |
|  | D₃ | | | | | |
|  | D₄ | 1 | 1 | 1 | - - - - - - - - - - - | 1 |
|  | D₅ | 1 | 1 | 1 | - - - - - - - - - - - | 1 |
|  | D₆ | 0 | 1 | 1 | - - - - - - - - - - - | 1 |

DATA DESIGNATED BY FREQUENCY DATA 20

METHOD OF CONTROLLING POLYPHASE INVERTERS AND CONTROL CIRCUITS THEREFOR

BACKGROUND OF THE INVENTION

This invention relates to a method of controlling a polyphase inverter and a control circuit therefor wherein the inverter is controlled by using a conduction pattern prestored in a memory device such as a programmable read only memory device (P-ROM) or a mask ROM, and more particularly to a method of controlling a polyphase inverter and a control circuit therefor in which the conduction pattern stored in the ROM is determined by utilizing the characteristic of a control signal for improving the utilization efficiency of the conduction pattern.

Usually, an inverter is constituted by a number of transistors or silicon controlled rectifier elements which are connected in a bridge circuit and control signals are applied to the base electrodes of the transistors or gate electrodes of the silicon controlled rectifier elements for converting a DC power into a single phase or three phase alternating power. Although various methods of forming the control signals for the inverter have been used, since, in an inverter designed to produce alternating current of variable frequency, the number of the conduction patterns is large, a ROM or other types of arithmetic operating units are frequently used.

However, since a conduction pattern of the inverter has been stored in the ROM over one period of the pattern, the utilization efficiency of the ROM is low so that it is necessary to use a large capacity ROM in order to ensure an accurate control. Furthermore, with a ROM of a prior art capacity it has been necessary to decrease its control resolution.

Figure 1:
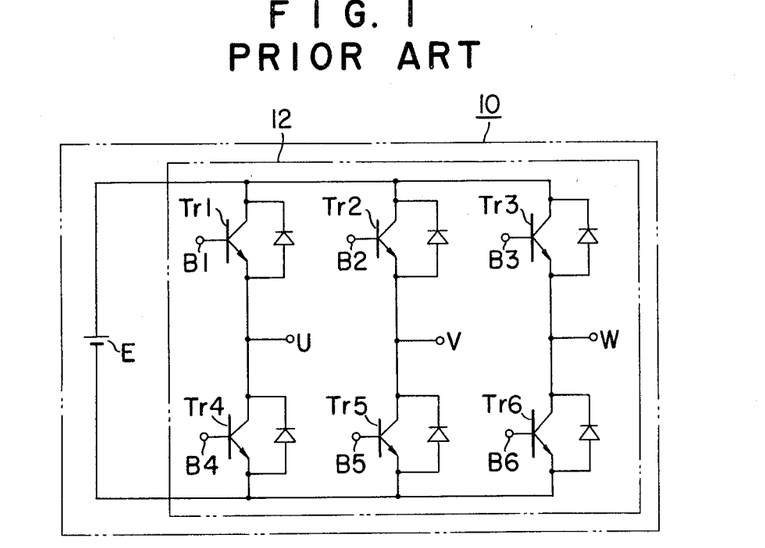
FIG. 1 is connection diagram showing a typical prior art 3 phase inverter.

These defects will be outlined in the following: Thus, FIG. 1 shows a typical prior art three phase inverter 10 comprising a bridge circuit 12 connected across a DC source E for producing three phase AC outputs. The bridge circuit 12 is made up of 6 switching transistors $T_{r1}$ through $T_{r6}$, two of them being connected in series to form three parallel branch circuits, and output terminals U, V and W are connected between junctions of the pairs of transistors $T_{r1}$, $T_{r4}$; $T_{r2}$, $T_{r5}$ and $T_{r3}$ and $T_{r6}$.

Base electrodes $B_1$ through $B_6$ of respective transistors are supplied with control signals from a control circuit to be described later to produce a three phase AC output power at the output terminals U, V and W.

Figure 2:
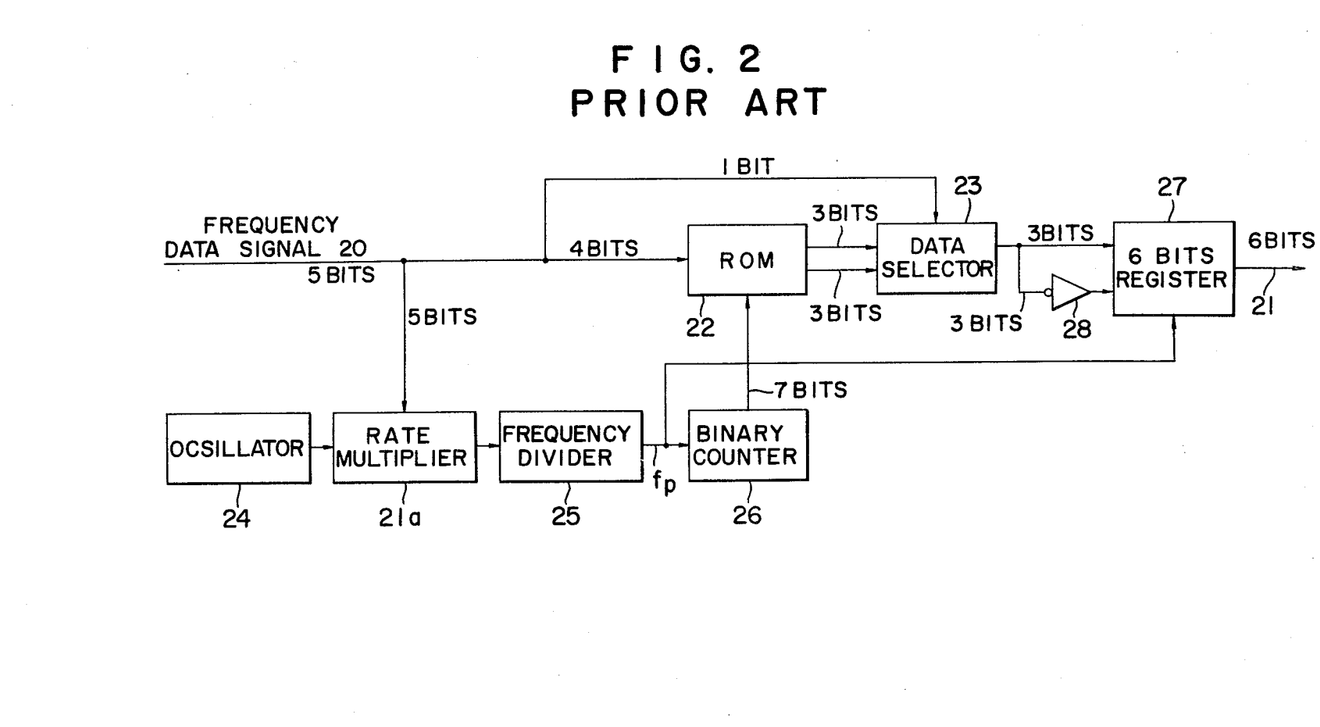
FIG. 2 is a block diagram showing a prior art control circuit for the three phase inverter shown in FIG. 1.

Usually, a control circuit as shown in FIG. 2 has been used for the inverter shown in FIG. 1. All bits of a 5 bit frequency data signal 20 generated by a frequency data oscillator, not shown, are applied to a rate multiplier 21a to be described later in detail, while 4 bits of the signal 20 are supplied to a ROM 22, and one bit to a data selector 23.

The purpose of the rate multiplier 21a is to convert a signal $f_{in}$ received from an oscillator 24 into the following output signal $f_{out}$:

$$f_{out} = \frac{M \cdot f_{in}}{64}$$

where M represents a constant, and 64 a constant determined by the number of bits 5.

Thus, the rate multiplier 21a converts the oscillation frequency $f_{in}$ into a signal having a frequency proportional to the oscillation frequency $f_{in}$. the output signal $f_{out}$ of the rate multiplier 21a is supplied to a frequency divider 25 to produce an output $f_p$ expressed by the following equation:

$$f_p = f_{out} \times \frac{1}{2^n} = \frac{M \cdot f_{in}}{64 \times 2^n}$$

where n represents the number of frequency division stages. The output $f_p$ of the frequency divider 25 is applied to a two stage counter 26 to obtain an output having a number of bits determined by the capacity of the ROM and the number of bits of a designated frequency data.

Typically, the ROM 22 has a memory capacity of 2048 words, each consisting of 8 bits. As above described, since the ROM 22 is supplied with a 4 bit signal from the frequency signal oscillator, it would receive a 7 bit signal from the counter 26. Thus, as the ROM 22 is supplied with the 4 bit signal from the frequency data oscillator, even when each one half of 8 bit data of 16 types is used, the ROM can be supplied with 32 types of the frequency data. Since the counter 26 is constructed to produce a 7 bit output, it can receive 128 signals.

Figure 3:
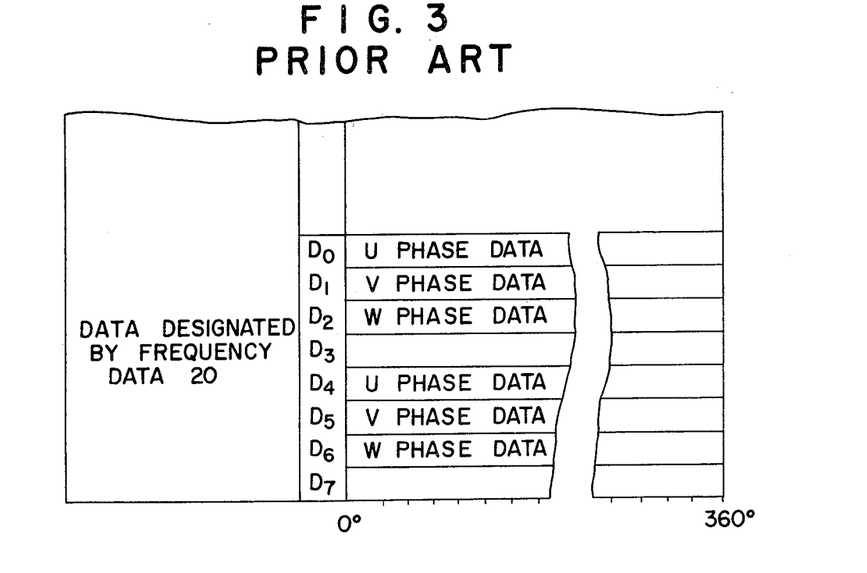
FIG. 3 is a chart showing a manner of storing data in the ROM shown in FIG. 2.

With the circuit shown in FIG. 2, data have been stored in the ROM 22 in a manner as shown in FIG. 3 in which the abscissa represents the electric degrees of data designated by the output of the counter 26, while the ordinate the data designated by the frequency data oscillator.

In this manner, since 16 or 32 types of data are stored in 128 sections the resolution of one data over 360° is approximately 3°.

These data are supplied from ROM 22 to the data selector 23 in response to a value designated by the frequency data and the output of the counter 26 for producing an AC output signal which is divided into two portions, one (3 bits) directly applied to a 6 bit register 27 and the other (3 bits) applied thereto through an inverter 28. The timings of these signals are matched by a 6 bit register 27 under the control of the output signal $f_p$ produced by the frequency divider 25 and then applied to the base electrodes $B_1$ through $B_6$ of the inverter transistors $T_{r1}$ through $T_{r6}$ to act as control signals.

Since the control circuit described above is constructed such that the ROM 22 is controlled by a 4 bit frequency designation signal and a 7 bit period division signal for producing control signals for the inverter in a ROM of a capacity of 2048 words, each consisting of 8 bits, the resolution of the angular frequency is about 3° meaning a low accuracy. The accuracy can be improved by using a large capacity ROM which is expensive.

SUMMARY OF THE INVENTION

It is an object of this invention to provide an improved method of controlling a polyphase inverter and a control circuit therefor capable of greatly improving the resolution of a ROM by utilizing the fact that the characteristics of the control signal vary similarly at any electric angle. In a case of a three phase inverter, the resolution of the ROM can be increased 6 times over that of a prior art circuit even when a ROM of the same capacity is used.

Another object of this invention is to provide a method of controlling a polyphase inverter and a control circuit therefor capable of increasing the freedom of selecting the conduction pattern of the ROM, improving the utilization efficiency of the ROM and simplifying the construction of the peripheral circuits associated with the ROM.

According to one aspect of this invention there is provided a method of controlling a polyphase inverter comprising the steps of dividing ideal polyphase sinusoidal waveforms into a plurality of consecutive sections having specific characterics and equal width in electric angles; encoding the sections for different frequencies to form a plurality of encoded data; storing the encoded data in a ROM; selectively reading out the encoded data stored in the ROM according to a predetermined conduction pattern of the inverter; combining in a succession the read out encoded data to form positive half cycle waveforms of the polyphase sinusoidal waveforms; inverting the read out encoded data and then combining them in succession to form negative half cycle waveforms respectively succeeding the positive half cycle waveforms thereby forming polyphase sinusoidal waveforms; and applying the polyphase sinusoidal waveforms to the inverter to act as control signals.

According to another aspect of this invention there is provided an inverter control circuit comprising a ROM; a rate multiplier means for applying frequency data of a predetermined frequency to the ROM and the rate multiplier; an oscillator for applying a constant frequency signal to the rate multiplier; a frequency divider for dividing a frequency of an output of the rate multiplier; a counter which counts a number of outputs of the frequency divider for storing electric angle data in the ROM; a multistage counter controlled by an output of the last stage of the first mentioned counter; a polyphase decoder controlled by an output of the multistage counter for producing polyphase alternating current signals; a plurality of data selectors respectively controlled by an output of the multistage counter for selectively reading out the electrical angle data from the ROM; a plurality of logic gate circuits respectively inputted with outputs of the data selector and the polyphase outputs of the polyphase decoder; and a multibit register supplied with noninverted outputs and inverted outputs of the logic gate circuits, and an output of the frequency divider for forming polyphase sinusoidal waveforms.

DESCRIPTION OF THE PREFERRED EMBODIMENTS

A preferred embodiment of the control circuit utilized for controlling a three phase inverter will now be described.

Figure 4A:
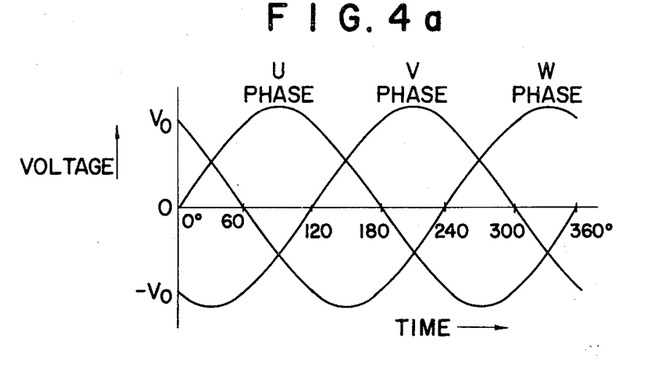
FIGS. 4a, 4b and 4c show ideal waveforms and synthesized waveforms of 3 phase AC voltage.

Considering ideal three phase alternating currents, the voltages of the phases U, V and W are dephased 120° as shown in FIG. 4a in which the ordinate represents voltages and the abscissa the time or electrical angles. When the negative half cycles of these voltages are inverted by inverters or the like, positive waveforms as shown in FIG. 4b will be obtained.

Figure 4B:
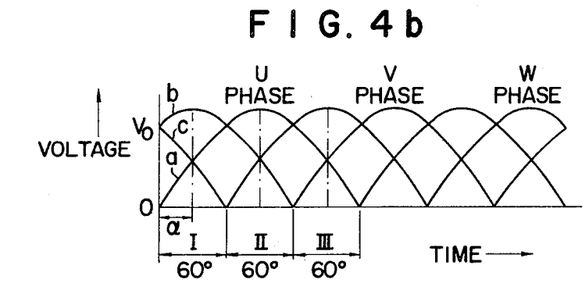

When one positive half cycles shown in FIG. 4b are divided into three sections I, II and III each occupying 60°, the waveforms of respective 60° sections are the same irrespective of the difference in the phases. The waveforms of these sections are symmetrical with respect to their dot and dash center lines.

Figure 4C:
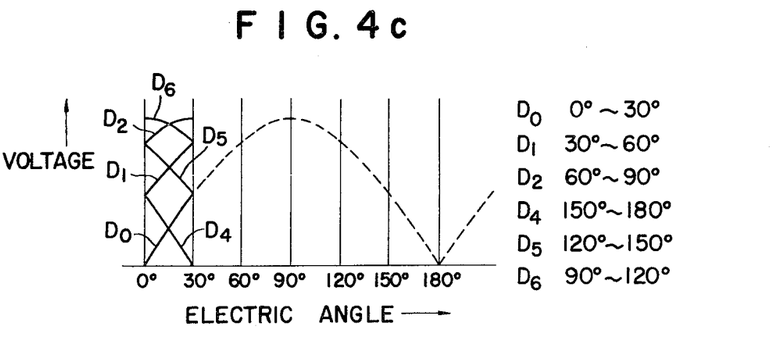

When these waveforms are superposed after shifting 30°, 6 characteristics $D_0$, $D_1$, $D_2$, $D_4$, $D_5$ and $D_6$ as shown in FIG. 4c can be obtained. In other words, by suitably combining these characteristics an ideal AC waveform could be obtained. More particularly, an ideal U phase positive half cycle can be formed by sequentially selecting characteristic $D_0$ between 0° and 30°, characteristic $D_1$ between 30° and 60°, characteristic $D_2$ between 60° and 90°, characteristic $D_6$ between 90° and 120°, characteristic $D_5$ between 120° and 150° and characteristic $D_4$ between 150° and 180°. Then, the succeeding negative half cycle can be formed by synthesizing these characteristics in the same manner after inverting their polarities, thus producing an ideal sine waveform. Thus, ideal three phase sinusoidal voltages spaced 120° from each other can be formed by properly selecting the characteristics described above. In other words, the three phase sine waveforms can be represented by the six characteristics each selected in a range of 0° to 30° as above described. For this reason, by storing these characteristics in a suitable memory device it is possible to use them to form three phase control signals for a three phase inverter.

This means that the conduction data obtained by dividing an interval of 360° with $2^7 = 128$ words according to the prior art circuit can be obtained by dividing an interval of 30° with $2^6 = 64$ words with control circuit of this invention. In terms of the electric resolution, it is improved 6 times, that is from $360°/128 \approx 3°$ to $30°/64 \approx 0.5°$.

Noting this fact, the invention contemplates provision of an improved method of controlling a polyphase inverter as well as an inverter control circuit capable of increasing the control resolution by 6 times by utilizing a conventional ROM of a relatively small capacity.

Figure 5:
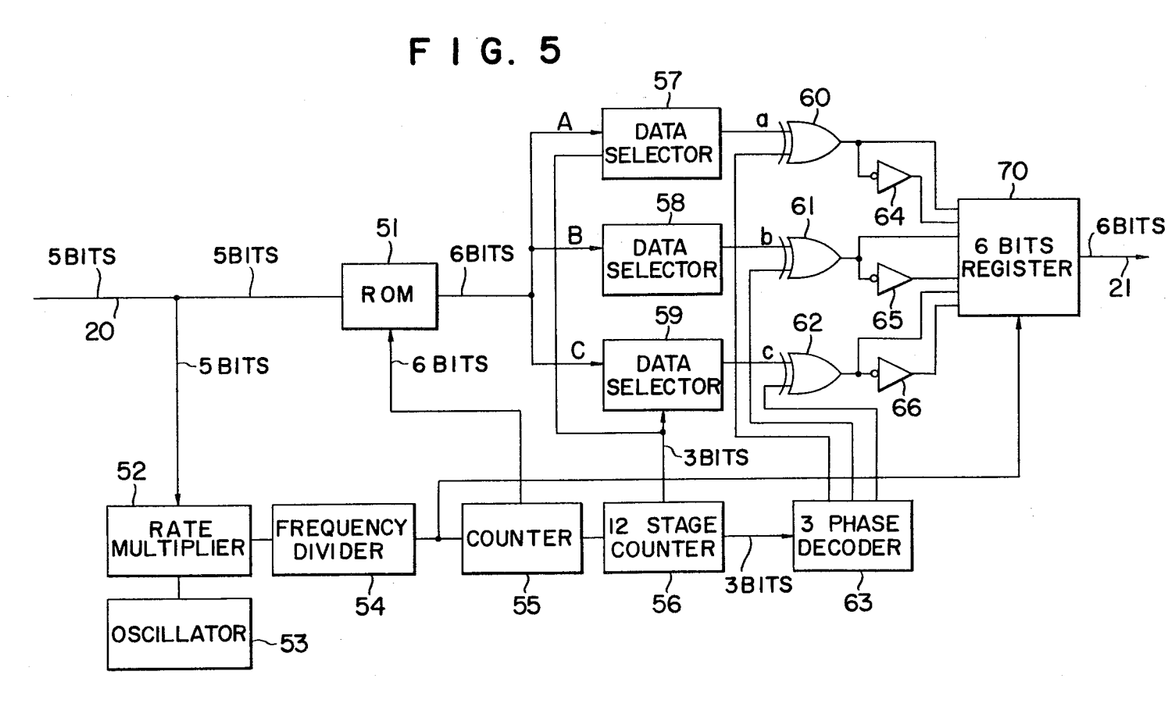
FIG. 5 is a block diagram showing one embodiment of the inverter control circuit according to this invention.

A preferred embodiment of this invention will now be described with reference to FIG. 5 in which a 5 bit frequency data 20 supplied from a frequency data oscillator, not shown, is applied to a ROM 51 and a rate multiplier 52 which converts the output $f_{in}$ of an oscillator 53 into an output $$f_{out} = \frac{M \cdot f_{in}}{64}$$

which is supplied to a frequency divider 54. In response to the output $f_{out}$, the frequency divider 54 produces an output $$f_p = \frac{1}{2^n} \cdot f_{out} = \frac{M \cdot f_{in}}{2^n}$$

which is applied to a counter 55. The elements described above have the same construction as those shown in FIG. 2. The counter 55 counts the number of the outputs $f_p$ and applies its outputs to ROM 51 and a 12 stage counter 56.

Figure 6:
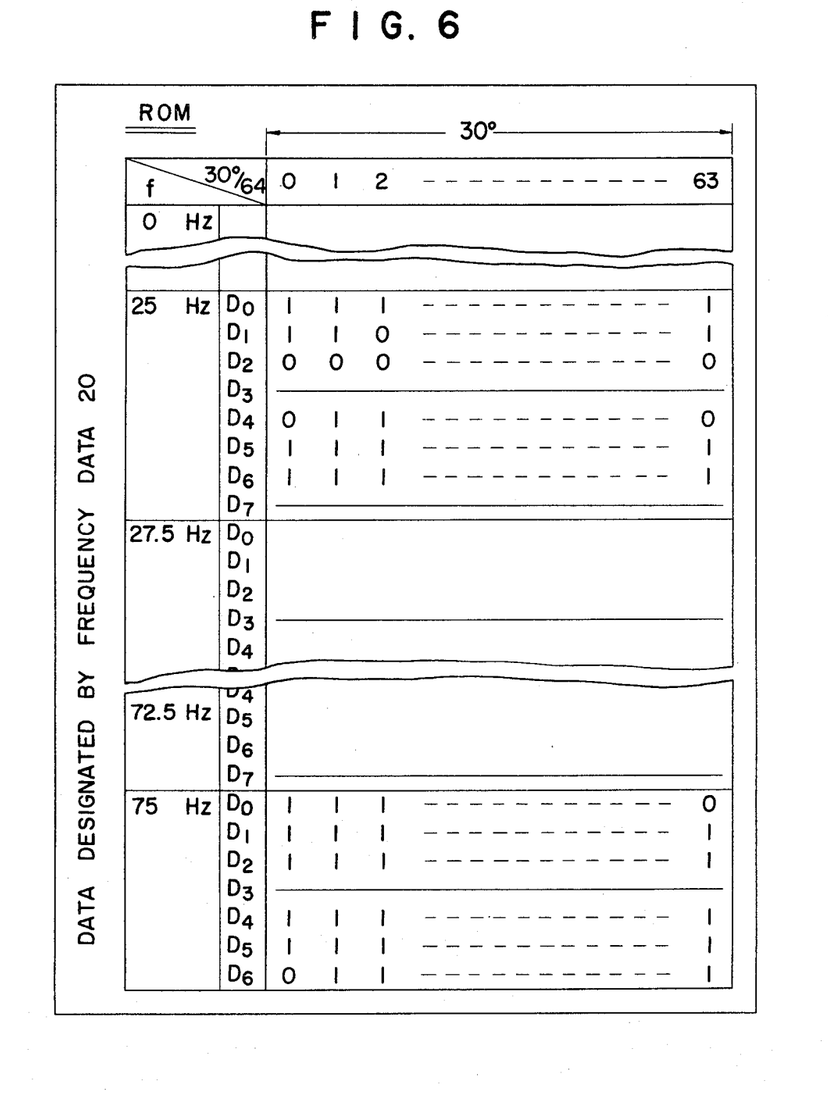
FIG. 6 is a chart useful to explain a method of storing data in the ROM shown in FIG. 5.

The ROM 51 may have the same capacity as the conventional ROM, in this case 2048 words each consisting of 8 bits and data are stored therein according to a chart shown in FIG. 6 by forming characteristics $D_0$ through $D_7$ similar to those shown in FIG. 4c. In FIG. 6 the ordinate is divided into several blocks for different frequencies, each block comprising 8 data of $D_0$, $D_1$, . . . $D_7$ and written with the 5 bit signals (32 types of the words) from the frequency data oscillator. In the leftmost column f are shown frequencies at a designated voltage. In this example, the number of frequencies, that is blocks is 32 ranging from 0 to 75 Hz. The abscissa represents 64 signals (each comprising 6 bits) obtained by dividing 30° with 64 and counted by the counter 55.

The data $D_0$ through $D_7$ are stored in the ROM 51 by using characteristics $D_0$ through $D_7$ shown in FIG. 4c of which data $D_3$ and $D_7$ are idle.

The ROM 51 storing these data is addressed by using the signal 20 having a frequency of 25 Hz, for example, and supplied from a frequency data oscillator to obtain output signals in the following manner.

To obtain a U phase voltage, a data selector 57 sequentially reads out characteristics in the order of $D_0$, $D_1$, $D_2$, $D_6$, $D_5$ and $D_4$ stored in the ROM 51 to form one half cycle wave over 180°, while 30° data that is 64 data are being scanned with a 12 stage counter 56 to be described later. Then, these read out characteristics are inverted to form a next negative half cycle.

In the same manner, to obtain a V phase voltage, a half cycle from −60° to plus 60° is formed by using inverted characteristics $D_2$, $D_6$, $D_5$ and $D_4$ and not inverted characteristics $D_0$ and $D_1$ and the next half cycle is formed by using not inverted characteristics $D_2$, $D_6$, $D_5$ and $D_4$ and inverted characteristics $D_0$ and $D_1$ which are read out with a data selector 58. In the same manner, a W phase voltage is formed with a data selector 59.

Figure 7:
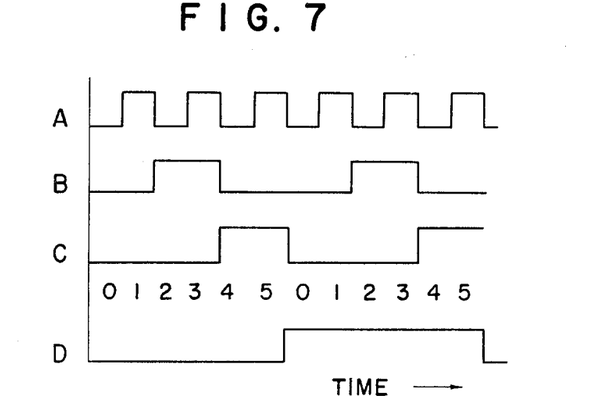
FIG. 7 shows output waveforms of the 12 stage counter 56 shown in FIG. 5.
Figure 8:
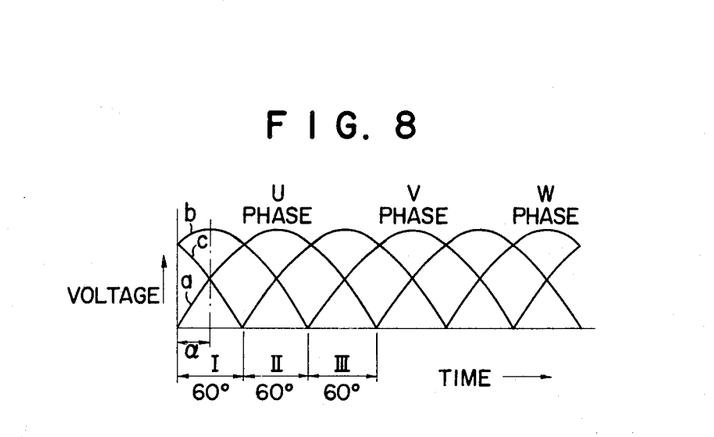
FIG. 8 shows output waveforms outputted from data selectors 57, 58 and 59 shown in FIG. 5.

Transfer of characteristics from $D_0$ to $D_1$, that is advance of the phase by 30° is effected by the 12 stage counter 56 which is constructed to produce waveforms A–D whose logic values vary between "0" and "1" as shown in FIG. 7 in which the abscissa represents time. These waveforms are synthesized, and the phase of frequency data is sequentially shifted by 30° with data selectors 57, 58 and 59 so as to read out characteristics $D_0$, $D_1$, . . . $D_7$ described above from ROM 51, thus forming output signals shown in FIG. 8.

Figure 9:
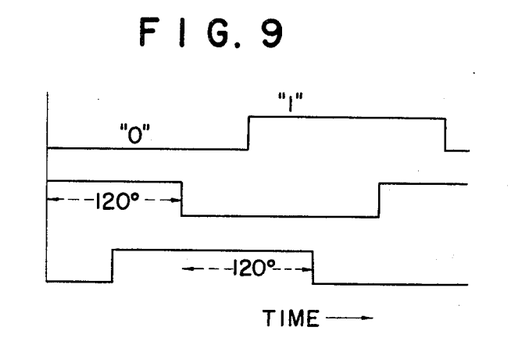
FIG. 9 shows output waveforms of the three phase decoder 63 shown in FIG. 5.
Figure 10:
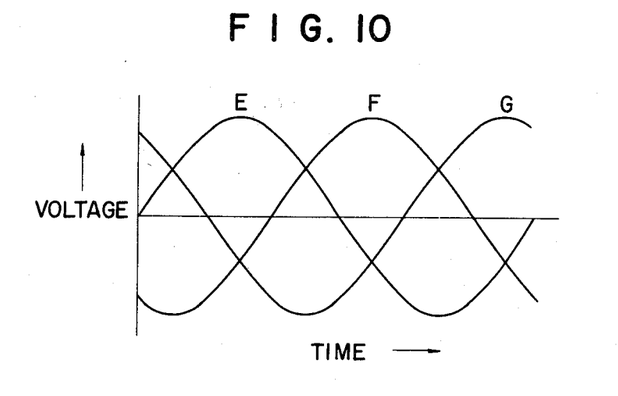
FIG. 10 shows output waveforms of the 6 bit register 70 shown in FIG. 5 and utilized as the control signals of a 3 phase inverter.

Since the signals derived out with the data selectors 57, 58 and 59 have waveforms as shown in FIG. 9, these waveforms are converted into sine waveforms in the following manner. Thus, the signals derived out by the data selectors 57, 58 and 59 are respectively applied to one inputs of exclusive OR gate circuits 60, 61 and 62, the other inputs thereof being supplied with three phase alternating current signals, 120° dephased as shown in FIG. 10 and produced by a three phase decoder 63 energized by the output of the 12 stage counter 56. These exclusive OR gate circuits 60, 61 and 62 invert or not invert the output signals in accordance with the signals derived out by the data selectors 57, 58 and 59 and with signals EF and G, thus forming three phase control signals having waveforms very close to ideal sine waveforms as shown in FIG. 10. Portions of these control signals are applied directly to a 6 bit register 70 while the other portions are applied thereto via inverters 64, 65 and 66, respectively. The output of the frequency divider 54 is also applied to the 6 bit register 70 for matching the timings of the output signals of the register 70. The outputs thereof are then applied to the base electrodes of transistors $T_{r1}$ through $T_{r6}$ of the inverter. Where thyristors are substituted for the transistors these outputs are applied to the gate electrodes of the thyristors. As a consequence, direct current is converted into three phase alternating current having a frequency of 25 Hz in this example. Thus, according to this invention, the inverter 10 can produce three phase alternating currents having waveforms very close to ideal sinusoidal waveforms.

Based on the fact that the respective phases of ideal three phase alternating currents are dephased 120° and that the positive and negative half cycles have the same waveform, according to this invention, the memory pattern of a ROM is made to be 1/6 of one hertz so as to increase the utilization efficiency thereof. Accordingly, the memory capacity of the ROM can be increased 6 times of that of the prior art control circuit. In other words, it is possible to store a memory pattern at an accuracy of 6 times. This not only increases the freedom of selection of a conduction pattern but also simplifies the construction of the peripheral logic circuit associated with the ROM. When used as the control circuit for an inverter, the control circuit of this invention can have a high control resolution.

I claim:

1. A method of controlling a polyphase inverter comprising the steps of:
    dividing ideal polyphase sinusoidal waveforms into a plurality of consecutive sections having specific characteristics and equal width in electric angles;
    encoding said sections for different frequencies to form a plurality of encoded data;
    storing the encoded data in a ROM:
    selectively reading out said encoded data stored in said ROM according to a predetermined conduction pattern of said inverter;
    combining in a succession said read out encoded data to form positive half cycle waveforms of said polyphase sinusoidal waveforms;
    inverting said read out encoded data and then combining in a succession to form negative half cycle waveforms respectively succeeding said positive half cycle waveforms thereby forming polyphase sinusoidal waveforms; and
    applying said polyphase sinusoidal waveforms to said inverter to act as control signals.

2. The method according to claim 1 wherein said inverter is a three phase inverter and said polyphase sinusoidal waveforms are three phase sinusoidal waveforms.

3. An inverter control circuit comprising:
    a ROM;
    a rate multiplier;

means for applying frequency data of a predetermined frequency to said ROM and said rate multiplier;

an oscillator for applying a constant frequency signal to said rate multiplier;

a frequency divider for dividing a frequency of an output of said rate multiplier;

a counter which counts a number of outputs of said frequency divider for storing electric angle data in said ROM;

a multistage counter controlled by an output of the last stage of said first mentioned counter;

a polyphase decoder controlled by an output of said multistage counter for producing polyphase alternating current signals;

a plurality of data selectors respectively controlled by an output of said multistage counter for selectively reading out said electric angle data from said ROM;

a plurality of logic gate circuits respectively inputted with outputs of said data selectors and said polyphase output of said polyphase decoder; and a multibit register supplied with noninverted outputs and inverted outputs of said logic gate circuits, and an output of said frequency divider for forming polyphase sinusoidal waveforms.

4. The inverter control circuit according to claim 3 wherein said inverter comprises a three phase inverter, said multistage counter comprises a 12 stage counter, said data selectors comprise 3 data selectors and said logic gate circuits comprise three exclusive OR gate circuits.

* * * * *